(12) United States Patent
Goyal et al.

(10) Patent No.: US 7,978,686 B2
(45) Date of Patent: Jul. 12, 2011

(54) SYSTEM AND METHOD FOR FEATURE-BASED SERVICES CONTROL USING SIP

(75) Inventors: Udit Kumar Goyal, Aligarh (IN); Gregory Slowiak, Cary, IL (US); Michael P. Dempsey, Park Ridge, IL (US); Anne-Marie Turgeon, Wakefield, MA (US)

(73) Assignee: Hewlett-Packard Company, Palo Alto, CA (US)

( * ) Notice: Subject to any disclaimer, the term of this patent is extended or adjusted under 35 U.S.C. 154(b) by 721 days.

(21) Appl. No.: 11/324,638

(22) Filed: Jan. 3, 2006

(65) Prior Publication Data

US 2007/0153770 A1 Jul. 5, 2007

(51) Int. Cl.
*H04L 12/66* (2006.01)
(52) U.S. Cl. ........................................................ 370/352
(58) Field of Classification Search ............. 370/395.52, 370/395.3, 467, 395.5, 395.2, 465, 466, 352, 370/356, 252
See application file for complete search history.

(56) References Cited

U.S. PATENT DOCUMENTS

| 2004/0008632 A1* | 1/2004 | Hsu et al. ...................... 370/252 |
| 2005/0223391 A1* | 10/2005 | McKinley et al. ............ 719/328 |
| 2006/0159246 A1* | 7/2006 | Abramson et al. ....... 379/207.02 |

* cited by examiner

*Primary Examiner* — Derrick Ferris
*Assistant Examiner* — Mohammad Anwar

(57) ABSTRACT

A system and method for feature-based service control using Session Initiation Protocol (SIP) in an Internet Protocol Automatic Branch Exchanges (IPABX) system is described. The system and method include a new Event package and new Enhanced SIP methods to control information for various feature-based services like wakeup alarm, call forwarding, voicemail configuration, and other services provided by traditional PBX systems. A user provides input to a client device to activate or deactivate feature-based services. In response, the client device sends a message to the IPABX server to activate or deactivate the feature-based service(s). The IPABX server then notifies the client device that the feature based-service(s) have been activated or deactivated.

30 Claims, 9 Drawing Sheets

```
802 ---- FEATURE sip:1001@192.168.1.35 SIP/2.0
804 ---- Via: SIP/2.0/UDP 192.168.1.113:5060
806 ---- From: <sip:1000@192.168.1.35;user=phone>;tag=667bfbb8
808 ---- To: <sip:1001@192.168.1.35;user=phone>;tag=9848df5a
810 ---- Call-Id: 667bfbb8-01d6-1f72-1422-00e0bb120c22@192.168.1.113
812 ---- CSeq: 2 FEATURE
814 ---- Feature-Type: *444*800
816 ---- Contact: <sip:1000@192.168.1.113:5060>
818 ---- User-Agent: 3Com SIP Phone V6
```

Figure 8

902 —— INVITE sip:*444*800@192.168.1.35 SIP/2.0
904 —— Via: SIP/2.0/UDP 192.168.1.113:5060
906 —— From: <sip:1000@192.168.1.35;user=phone>;tap=667bfbb8
908 —— To: <sip:*444*800@192.168.1.35;user=phone>;tag=9848df5a
910 —— Call-Id: 667bfbb8-01d6-4f72-1422-00e0bb120c22@192.168.1.113
912 —— CSeq: 2 FEATURE
914 —— Contact: <sip:1000@192.168.1.113:5060>
916 —— User-Agent: 3Com SIP Phone V61: 0

Figure 9

SYSTEM AND METHOD FOR FEATURE-BASED SERVICES CONTROL USING SIP

FIELD

The present invention relates generally to Session Initiation Protocol (SIP) services, and more particularly, relates to PBX feature-based service invocation using SIP.

BACKGROUND

The Internet infrastructure has grown continually and significantly over the recent years. In conjunction with this growth, traditional telephony services continue to migrate to new platforms and protocols that operate via the Internet. The increasing use of Internet telephony has spurred development and introduction of numerous telephony services. The widespread use of standardized Internet telephony protocols as an interface help assure that a user and a server can rely on a commonly used method for exchanging information.

Internet telephony involves the transport of real-time media, such as voice and video, over the Internet to provide interactive communication among Internet users. Unlike a circuit-based system (e.g., existing telephone system such as a Public Switched Telephone System (PSTN)), Internet Protocol (IP) telephony is a packet-based communication system. In a packet-based system, packets of data are routed over a network to reach a destination.

Currently, traditional PSTN telephony uses SS7 (Signaling System 7) as the signaling protocol which establishes, controls, and tears down circuit connections. On the other hand, IP telephony uses Session Initiation Protocol (SIP) as the signaling protocol for telephony, videoconferencing, and multimedia sessions. SIP is a data-oriented protocol used by source and destination end devices for communicating data across a packet-based communication system.

A SIP system consists of a network server and an end device (also known as a client device). The end device is an end system that acts on behalf of someone who participates in calls. Further, there are two different types of network servers (i) a proxy server, which receives requests, determines which server to send it to, and then forwards the request, and (ii) a redirect server, which receives requests, but instead of forwarding them to the next proxy server, tells the client to contact the next proxy server directly. The SIP system may include multiple network servers or end devices.

In traditional telephone systems, a Private Branch Exchange (PBX) is a private network used for business voice communication. The PBX is a subscriber-owned telecommunications exchange that usually includes access to a public switched telephone network (PSTN). The functions of the PBX include connecting end devices such as telephones, and maintaining such connections. The PBX offers various feature-based services such as voicemail, music on hold, call forwarding, and conferencing, to name a few. The feature-based services may be activated through service-specific buttons on end devices.

Traditional PBXs manage and control feature-based services through a PBX server. As an example, a user provides an input to activate a feature through service-specific buttons on a conventional telephone. The input is then transmitted to the PBX server that activates the feature.

Increasingly, traditional PBXs are being phased out. On the other hand, PBXs used in conjunction with an Internet Protocol, hereby known as an Internet Protocol Automatic Branch Exchanges (IPABX), are becoming common. The replacement of traditional PBXs with IPABXs will require that users have the same services from their IP-enabled desktop telephone that they previously had from their traditional PBX telephone.

Typical communication mechanisms used to convey so-called feature data from an end device to a PBX or IPABX are custom-designed messaging systems. That is, an end device (hereby referred to as a client device), such as a Voice over Internet Protocol (VOIP) enabled telephone or a telephone configured with SIP, provides data to the IPABX using a proprietary message format and signaling scheme that is unique to the particular IPABX system. The inventors have discovered that a generic and standardized mechanism to invoke feature-based services through the client device is desirable. The present invention proposes a mechanism to achieve the activation of feature-based services in an IPABX system.

SUMMARY

A preferred embodiment of the invention describes a system and method for feature-based service control using Session Initiation Protocol (SIP) in an IPABX system. A user provides input to a client device using a feature code and/or a feature button on the client device. The feature code and/or a feature button allow invocation of feature-based-services.

A first preferred embodiment provides a new Event package conforming to Internet Engineering Task Force Request For Comments (RFC) 3265, which is an extension to the SIP standard, RFC 3261. The new Event package, preferably entitled "Feature," contains messaging definitions of control information for various feature-based services such as wakeup alarm, call forwarding, voicemail configuration, and other IPABX services. The first preferred embodiment further provides an extension to SIP that is used to notify network servers of activation or deactivation of feature-based services for a particular user or device. This extension to SIP defines the new Event Package, "Feature," and allows a client device to communicate with the IPABX server to activate and deactivate feature-based services.

In the first preferred embodiment, the feature code and the feature button allow a user to activate feature-based services utilizing the new SIP Event package, "Feature." This event package includes markup language to enable communication between a client device and an IPABX server to activate or deactivate feature based-services.

A second preferred embodiment provides new enhanced SIP methods to invoke feature-based services. The new enhanced SIP methods include two methods to activate and deactivate feature based-services. The first enhanced SIP method is a new SIP method conforming to RFC 3261. This new SIP method invokes activation and deactivation of features and is preferably entitled "FEATURE." The "FEATURE" method includes a new request header, "Feature-Type," that contains a new feature request string as defined by RFC 3261. The header field of "Feature-Type" contains a feature code. The header field of "Feature-Type" may further contain feature supplemental parameters. Preferably, the "FEATURE" method provides a direct request method to activate and deactivate features during a phone call.

The second enhanced SIP method is an INVITE request method that includes a feature identification parameter to invoke feature-based services. In particular, the Uniform Resource Identifier (URI) of the INVITE method contains a feature identification parameter and may contain other feature supplemental parameters. Preferably this enhanced SIP method is used to activate and deactivate features during an out of call period (i.e., when there is no call session established).

In both preferred embodiments, the IPABX server is informed of feature activation via messages from an administration interface, such as a web-provisioning interface. The IPABX may also be configured to inform an end user of the feature activation or deactivation, whether the activation is initiated through an administration interface or the end user device.

An aspect of both preferred embodiments provides a system and method that allows the IPABX server in a SIP-based telephony system to perform all the functions of a traditional PBX system.

Another aspect of both preferred embodiments allows traditional PBX functions to be performed in an IPABX system, without requiring that the client devices in the IPABX system be able to perform all of the traditional functions.

Further, another aspect of both preferred embodiments provides a system and method for notifying a particular client device of feature activation or deactivation status.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred first and second embodiments are described below in conjunction with the appended drawing figures, wherein like reference numerals refer to like elements in the various figures, and wherein:

FIG. 8 is a diagram of an exemplary feature request message using a feature method in the second preferred embodiment.

FIG. 9 is a diagram of an exemplary feature request message using an invite method in the second preferred embodiment.

DETAILED DESCRIPTION

1. General Architecture Overview

Figure 1:
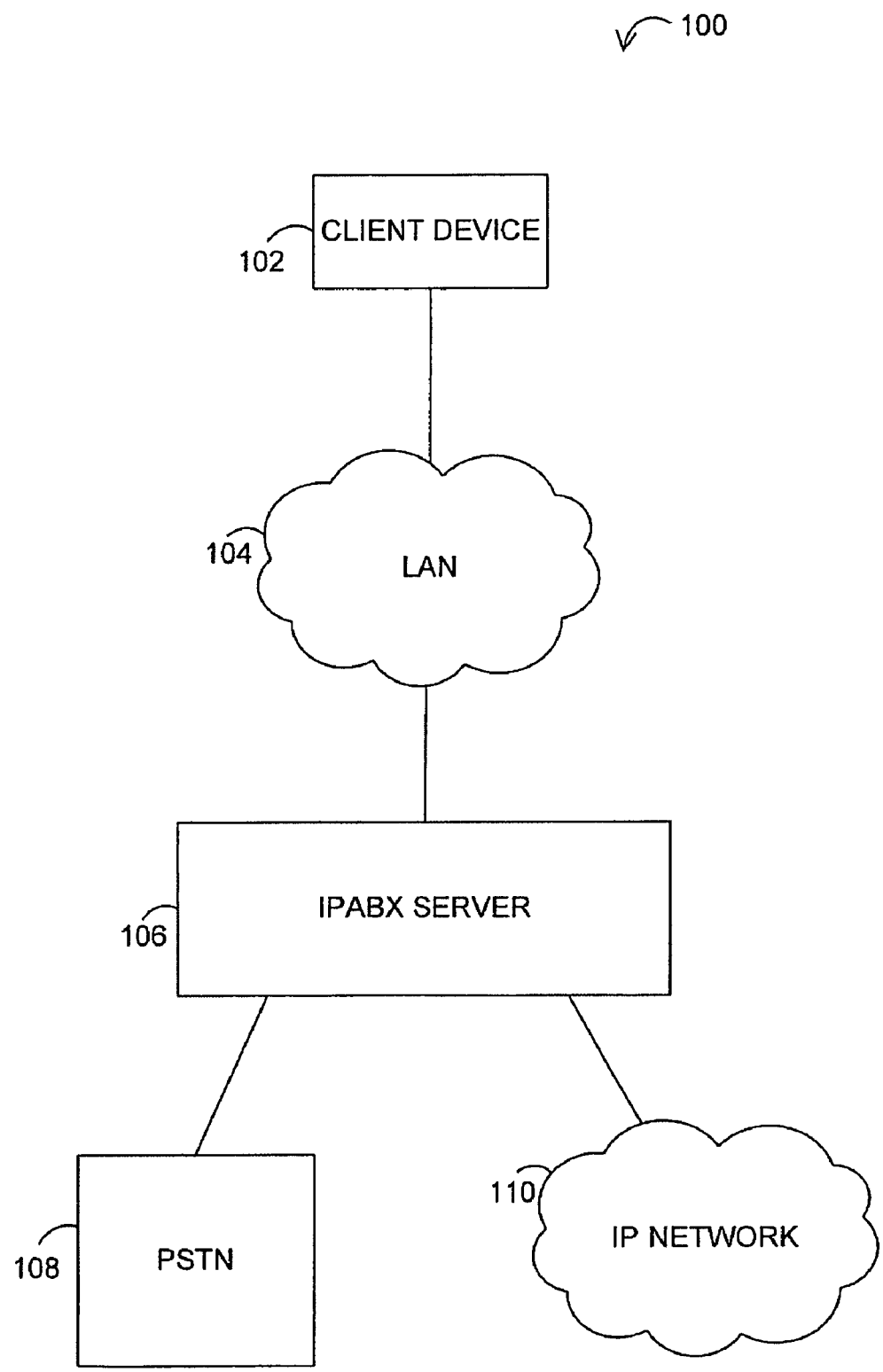
FIG. 1 illustrates a simplified block diagram of a network system arranged to carry out the first and second preferred embodiments.

FIG. 1 illustrates a simplified block diagram of a network system 100 in which a preferred embodiment of the present invention may be employed. It should be understood, of course, that this and other arrangements and functions described herein are set forth for purposes of example only. As such, those skilled in the art will appreciate that other arrangements and other elements can be used instead, and elements can be added, omitted, combined, distributed, re-ordered, re-positioned, or modified in other ways. Further, various functions described herein as being performed by one or more entities may be carried out by hardware, firmware, and/or software logic. For instance, various functions may be carried out by a processor executing instructions stored in memory.

In the preferred embodiments, a signaling protocol used in the IP telephony communication system 100 may be the Session Initiation Protocol ("SIP") signaling protocol. Other signaling protocols, such as H.323, Media Gateway Control Protocol ("MGCP"), Media Gateway Control Protocol ("MEGACO"), and other standard or proprietary techniques may alternatively be used. Internet Engineering Task Force ("IETF") Requests For Comments ("RFC") 3508 that describes H.323 protocol, RFC 2705 that describes MGCP, and RFC 3015 that describes MEGACO are each entirely incorporated by reference herein, as if fully set forth in this description.

As shown in FIG. 1, the network system 100 may include a client device 102, a Local Area Network (LAN) 104, and Internet Protocol Automatic Branch Exchange (IPABX) server 106, a public switched telephone network (PSTN) 108, and an internet protocol (IP) network 110. The client device 102 is preferably connected to the IPABX server 106 via LAN 104. In addition, the IPABX server 106 may be connected to the PSTN 108 and/or to the IP network 110. Further, an intermediary server may be located between the client device 102 and the IPABX server 106. The intermediary server may acts as both a server and a client device for the purpose of processing messages on behalf of the client device 102 and the IPABX server 106.

Before describing the details of the telephony network shown in FIG. 1, a brief overview of SIP will be described herein. For a more detailed description of SIP, reference may be made to IETF RFCs 3261, 3262, 3263, 3264, and 3265, all of which are specifically incorporated in their entirety herein by reference.

a. Session Initiation Protocol (SIP) Overview

Session Initiation Protocol (SIP), defined in RFC 3261, is an application level signaling protocol for setting up, modifying, and terminating real-time sessions between participants over an IP (Internet Protocol) data network. SIP is one of many protocols for exchanging media content. SIP supports Internet telephony, also referred to as Voice Over Internet Protocol (VOIP).

Particularly, SIP can establish two-party sessions (ordinary telephone calls), multiparty sessions (where everyone can hear and speak), and multicast sessions (one sender, many receivers). The sessions may contain audio, video, or data content. SIP handles call setup, call management, and call termination and may use other protocols to do so, such as RTP for transporting real-time data and for providing Quality of Service ("QoS") feedback, and the Real-Time Streaming Protocol ("RTSP") for controlling delivery of streaming media.

A system using SIP can be viewed as consisting of components defined on two dimensions: client/server and individual network elements. Further, the SIP system is based on an HTTP-like request/response transaction model. Each transaction consists of a client request that invokes a particular method, or function, on the server and at least one response. SIP uses most of the header fields, encoding rules, and status codes of HTTP.

The SIP protocol is a text-based protocol in which one party sends a message in American standard code for information interchange ("ASCII") text consisting of a method name on the first line, followed by additional lines containing headers for passing parameters. Many of the headers are taken from multipurpose Internet mail extensions ("MIME") to allow SIP to interwork with existing Internet applications.

To establish a call session between two or more client devices, one client device would send to another an INVITE message. The transmission of the INVITE message may use TCP or UDP protocol, for example. In either case, the headers on the second and subsequent lines of INVITE message describe the structure of the message body, which contains the calling user agent's capabilities, media types, and formats. The INVITE message also contains a user identifier to identify the called client device, and a session description that informs the called client device what type of media the calling client device can accept and where the calling wishes the media to be sent. Client device identifiers in SIP requests are known as SIP addresses. SIP addresses are referred to as Universal Resource Indicators (SIP request-URIs), which are of the form sip:user@host.domain. Other addressing conventions may also be used.

Upon receiving the INVITE request, the called client device may transmit a response message ACK to the calling user agent, and if the called client device accepts the call, the called client device will respond with a 200 OK message. Following the reply code line, the called client device may also supply information about its capabilities, media types and formats.

If the transmitted response message is a success, the calling client device may send an ACK message back to the called client device to confirm receipt of the 200 OK message and complete the call initiation process. After the call has been initiated using the SIP signaling protocol, the call is connected and media data (including voice information, etc.) can flow on a data channel between the client devices and through an access and a data network.

There have been several additions to the SIP protocol, which for example allow event notification based on SIP. One of these Extensions is the SIP events framework, which is specified in RFC 3265. The SIP events framework allows a user to subscribe to certain types of information (so-called "events") from a notifier. The information to be reported by a notifier to a subscriber is defined by an event package, and the notifier then sends notifications to the subscriber when the information changes. The SIP events framework leaves the definition of SIP events to the event packages, which are concrete extensions of the SIP events framework. The capabilities of SIP event packages have not previously been applied to feature-based services as described herein. That is, a SIP event package for activating feature-based services (e.g. wakeup alarm, call forwarding, certain voice mail features, and other services) has not heretofore been accomplished. Although feature-based services have been activated either through a web interface or having different service-specific buttons on Internet Protocol (IP) phones, no approach is available for activating feature-based services using SIP.

2. First Preferred Embodiment

In the first preferred embodiment, a user provides input to a client device using a feature code and/or a feature button on a client device. The feature code and the feature button allow a user to activate feature-based services utilizing the new SIP Event package, "Feature." This event package includes markup language to enable communication between a client device and an IPABX server to activate or deactivate feature based-services.

In response to receiving the user input, the client device sends a SIP SUBSCRIBE message to the IPABX server to activate or deactivate the feature-based services. The body of the SIP SUBSCRIBE message contains detailed information about the feature-based service. Upon receiving the SIP SUBSCRIBE message, the IPABX server sends a SIP successful response message to client device. In response, the IPABX server processes the data received from the SIP SUBSCRIBE message to activate or deactivate the feature-based service. In some preferred embodiments, the IPABX server then sends a SIP NOTIFY message to the client device in response to the SIP SUBSCRIBE message indicating the result of feature-based service activation or deactivation. The client device may optionally display the result to the user.

a. Client Device 201, and IPABX Server 106

Figure 2:
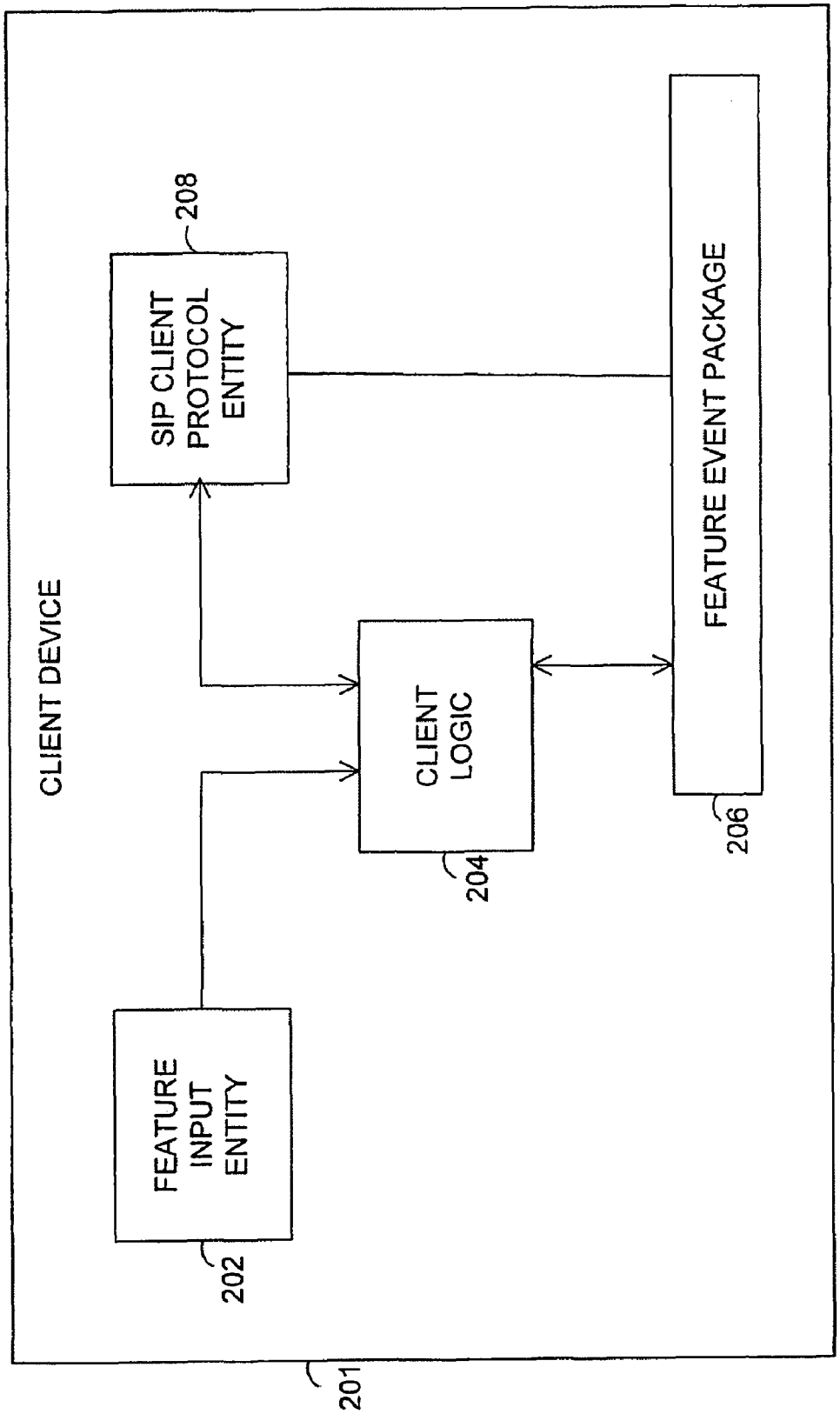
FIG. 2 illustrates a block diagram of a client device arranged to carry out the first preferred embodiment of the messaging system.

FIG. 2 depicts details of the client device 102 in accordance with the first preferred embodiment. The client device 201 may include a feature input entity 202, client logic 204, feature event package 206, and a SIP client protocol entity 208. The client device 201 is preferably a Voice over Internet Protocol (VOIP) enabled telephone, a telephone configured with SIP, a computer program that uses SIP, and/or a conventional telephone device configured with a SIP client protocol entity 208 and taking the role of a SIP client device as discussed in further detail in RFC 2543. Examples of a client device 201 include 3COM® 3102 Business Phone, product number 3C1042A, and a 3COM® 3103 Manager Phone, product number 3C1043A, both being manufactured by 3COM® Corporation, Marlborough, Mass., 01752-3064. Alternatively, a conventional telephone may be connected to the client device 201. The combination of the conventional telephone and the client device 201 may collectively be referred to as the client device 201.

The feature input entity 202 may be associated with hardware, firmware, software instructions and/or machine code for receiving input from a user. The feature input entity 202 allows a user to provide input to activate/deactivate a feature from an IPABX feature set (wherein this input is hereby known as an IPABX feature request).

The feature input entity 202 may be a feature button. The feature button may be preprogrammed to provide a feature-based service selectable by a user. The feature-based service will herein be referred to as a feature. Pressing the feature button may cause the client device 201 to enter a mode where subsequently pressed digits specify the desired feature. Alternatively, the feature button 202 may provide a list of feature names, feature identification parameters, and/or feature supplemental parameters on a display or other output device that are then selectable by a user.

The feature input entity 202 may further be in the form of keypad dialing buttons. The dialing buttons may provide means for entering features names, feature identification parameters, and/or supplemental feature parameters. Each of the keypad dialing buttons is associated with a numeral 0-9 inclusive, a "#" symbol, or a "*" symbol. One or more of the dialing buttons can be associated with one or more letters of an alphabet for use in spelling words. Depending on the operating state of the client device 201, pressing a dialing button may represent a numeral, a "#" symbol, a "*" symbol, a letter of an alphabet, or any other symbol or function that may be associated with the pressed button. In this embodiment, feature activation may be indicated by a predetermined key or sequence of keys, and may also involve the use of interactive voice response IVR.

The feature input entity 202 may also be a voice activated feature system. The voice activated feature system can process a voice signal matched to a feature request provided through a microphone.

Further, the client logic 204 may include software instructions and/or machine code stored in memory, executable by one or more processors. In addition, the client logic 204 may comprise firmware and/or hardware instead or in addition to the software instructions and/or machine code. Client logic 204 may use the feature event package 206 to determine that the input provided through the feature input entity 202 is indicative of the IPABX feature request. Further, the client logic 204 may communicate with the SIP client protocol entity 208 to transmit the input to the IPABX server 106, and also to receive data from the IPABX server 106.

Preferably, the feature event package 206 is an extension to SIP conforming to RFC 3265. In the preferred embodiment, the feature event package 206 provides a formal definition of features and parameters. In particular, the feature event package 206 may include a feature application template. The client feature application template may include a list of IPABX features from an IPABX feature set. For each valid feature in the IPABX feature set, the client feature application template includes feature names, feature identification parameters, and/or supplemental feature parameters. As an example, feature event package 206 may simply be entitled "Feature."

Below is a list of features names and definitions of features that may be included in the IPABX feature set and in the feature event package 206:

Wake-Up Alert: Set up an alarm for a particular time such that a user will be notified with the alarm.
Music-On Hold: Play music or announcements while a user is on hold, in queue or being transferred.
Video-On Hold: Play video or announcements while a user is on hold, in queue or being transferred.
Call Park: Place a call on hold so that it can be picked up from another extension on the IPABX system.
Call Pickup: Pick up a call that is ringing on another user's client device.
Call Toggle: Toggle between two calls.
Caller Identification Restriction: Restrict the IPABX system from sending out caller identification information for all calls.
Conference Call: Add one caller to an already-established telephone call.
Direct Mail Transfer: Transfer a call directly to another person's voice mailbox in the IPABX system.
Do Not Disturb: Send all incoming calls directly to the call coverage point.
Flash: Signal a central office to put a existing call on hold and toggle to the call that is waiting.
Call Forwarding: Send all incoming calls to a voice mailbox (or to a coverage point).
Hold: Place a telephone call on hold.
Lock your Telephone: Prevent other users from dialing unauthorized telephone calls from your telephone.
Voicemail Retrieval Message: Present a message for retrieval of voicemail messages.
Redial: Redial the last number that was called on a client device.
Show Lists: Show calls from call logs, directory, personal speed dials.
Speed Dial: Dial a party to whose number a user has given a personal speed dial number.
Transfer: Transfer a call to another telephone number.
Paging: Broadcast an announcement over the IPABX system or an external system.
Voicemail Configuration: Set up a centralized system for managing telephone messages.

Variations of the above features may also be included in the IPABX feature set. Additionally, other features now known or later developed may be included in the IPABX feature set.

Next, the SIP client protocol entity 208 may include a collection of modules or layers of software that together combine to produce the software that enables the protocol to work, i.e. to allow communications between dissimilar devices. The collection of modules or layers of software are also known as a SIP stack. The SIP client protocol entity 208 may be used to send and receive messages from the IPABX server 106.

The application layer, the first and topmost layer in the SIP client protocol entity 208, preferably includes SIP. The transport layer, the second layer, may include a User Datagram protocol (UDP) or Transmission Control Protocol (TCP). The network layer, the third layer, may include an Internet Protocol such as IPV6. The fourth and the bottommost layer may include a physical layer such as wires, fiber optic links and/or radio links. Other protocols may replace or be included in addition to the protocols mentioned in each layer. In addition, these layers may be combined together or subdivided into additional layers.

Figure 3:
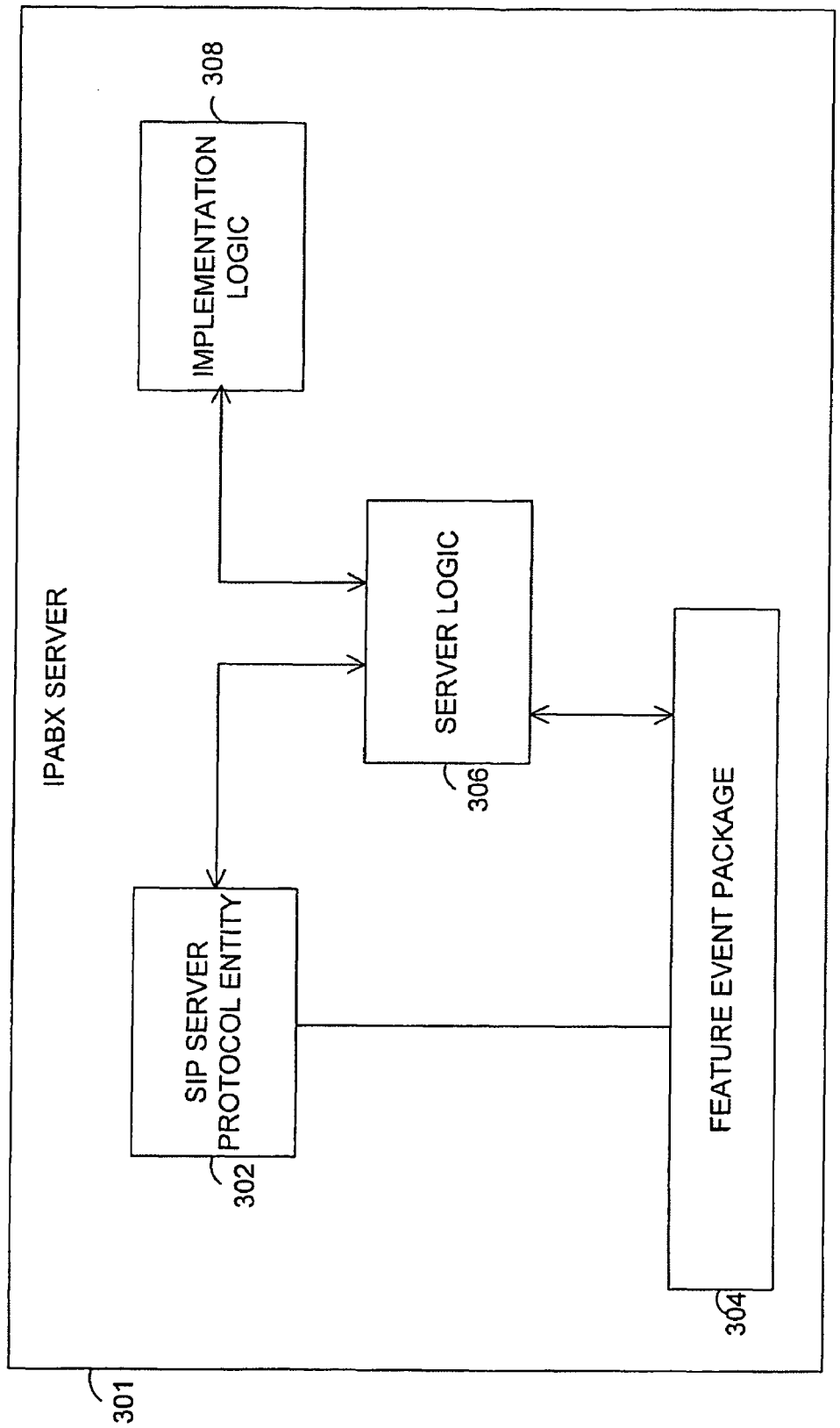
FIG. 3 illustrates a block diagram of an IPABX server arranged to carry out the first preferred embodiment of the messaging system.

Referring next to FIG. 3, details of the IPABX server 106 are depicted in accordance with the first preferred embodiment. The IPABX server 301 may include a SIP server protocol entity 308, feature event package 304, server logic 306 and implementation logic 308. The IPABX server 301 may be a network element that receives requests in order to service them and sends back responses to those requests. Preferably, the IPABX server 301 processes the IPABX feature request to activate/deactivate a feature.

The SIP server protocol entity 302 may include a collection of modules or layers of software that together combine to produce the software that enables the protocol to work, i.e. to allow communications between dissimilar devices. The collection of modules or layers of software are also known as a SIP stack. The SIP server protocol entity 302 may be used to send and receive messages from the client device 201.

The application layer, the first and topmost layer in the SIP server protocol entity 302, preferably includes SIP. The transport layer, the second layer, may include a User Datagram protocol (UDP) or Transmission Control Protocol (TCP). The network layer, the third layer, may include an Internet Protocol such as IPV6. The fourth and the bottommost layer may include a physical layer such as wires, fiber optic links and/or radio links. Other protocols may replace or be included in addition to the protocols mentioned in each layer. The SIP server protocol entity 302 is used to send and receive messages from the client device 201. In addition, these layers may be combined together or subdivided into additional layers.

Preferably, the feature event package 304 is an extension to SIP conforming to RFC 3265. In the first preferred embodiment, the feature event package 304 is a formal definition of features and parameters. In particular, the feature event package 304 may include a feature application template. The client feature application template may include a list of IPABX features from an IPABX feature set. For each valid feature in the IPABX feature set, the client feature application template includes feature names, feature identification parameters, and/or supplemental feature parameters. The feature event package 304 is similar and/or identical to the feature event package 206. As an example, feature event package 304 may simply be entitled "Feature."

The server logic 306 may include software instructions and/or machine code stored in memory, executable by one or more processors. However, the server logic 306 can comprise firmware or hardware instead or in addition to the software instructions and/or machine code. The server logic 306 can communicate with the feature event package 304 to process the IPABX feature request. The server logic 306 may also communicate with the SIP server protocol entity 208 to transmit messages to the client device 201, and also to receive messages from the client device 201. Further, the server logic 306 may determine that a particular feature needs to be activated/deactivated and instruct implementation logic 308 to activate/deactivate the feature.

The implementation logic 308 may include software instructions and/or machine code stored in memory, and executable by one or more processors. However, the implementation logic 308 can comprise firmware or hardware instead or in addition to the software instructions and/or machine code. The implementation logic 308 preferably activates a feature indicated by the IPABX feature request, and/or instructs another server or device to activate/deactivate a feature indicated by the IPABX feature request. The implementation logic 308 may instruct another server or device via the PSTN 108 or the IP network 110. The activation of a feature using implementation logic 308 is well known to an ordinary person skilled in the art.

b. Exemplary Operation

Figure 4:
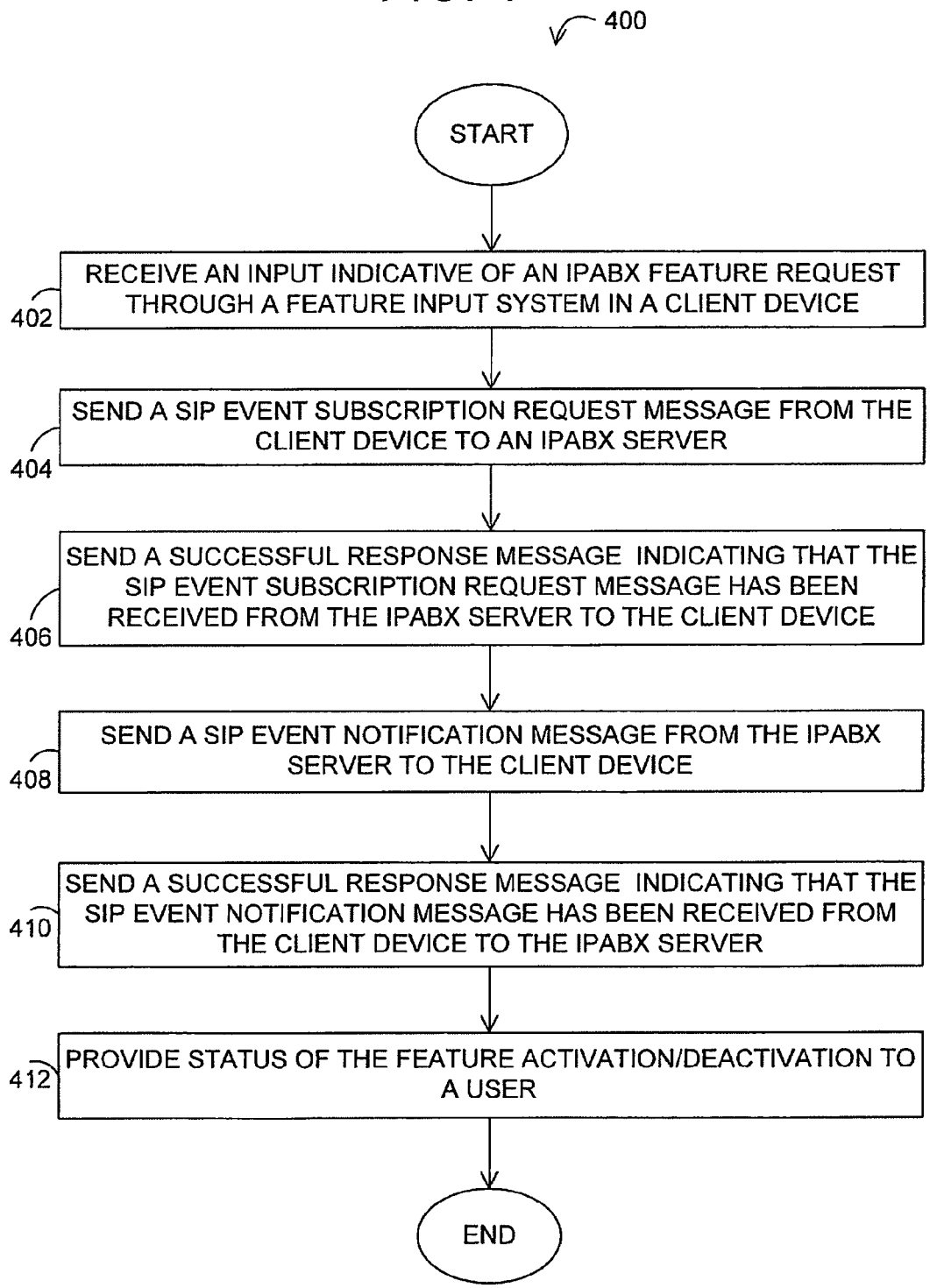
FIG. 4 depicts a flow chart of functions in accordance with the first preferred embodiment of the messaging system.

FIG. 4 is a generalized flow chart 400 of functions carried out in accordance with the first preferred embodiment. Each step in the flow chart is described with an example relating to an activation of a wake-up alert (i.e., wake-up alarm) feature. In this example, a user wishes to activate a wake-up alarm feature for 6:50 AM using the client device 201 that is capable of interfacing with the IPABX server 301.

At step 402, the client device 201 receives an input indicative of an IPABX feature request from a user. The user may provide the input directly into the feature input entity 202 in the client device 201. Alternatively, a user may provide the input into a conventional telephone connected to the client device 201. Using this connection, the input may be transmitted to the client device 201. The input may be a keypad input and/or a voice input.

Further, the input may contain a parameter, which is recognized by the conventional telephone as corresponding to the IPABX feature request. The conventional telephone may then transmit the input to the client device 201. Additionally, the client device 201 may be pre-programmed to receive an input indicative of an IPABX feature request at a particular time or at a particular occurrence.

The input may be in the form of a feature name, a feature identification parameter, and/or a supplemental feature parameter. The input may include (i) a beginning parameter that conveys to the client device 201 that the user wishes to provide the IPABX feature request, (ii) the feature name, the feature identification parameter, and/or the feature supplemental parameter, and (iii) an end parameter that conveys to the client device 201 that the user is finished providing the IPABX feature request.

For example, the user may wish to activate a wake-up alert feature for 6:50 AM using the client device 201. The user may dial digits *55#0650 (in which *55 may be the feature identification parameter, and 0650 may be the supplemental feature parameter indicating the wake-up time) directly into the feature input entity 202.

Preferably, the client logic 204 in the client device 201 gathers all the necessary data from the input and determines that the input is an indication to activate a feature using definitions and parameters set forth in the feature event package 206. The definitions and parameters in the feature event package preferably allow the client logic 204 to recognize that the input corresponds to the IPABX feature request.

Referring to the example, the client logic 204 may recognize that *55 is an indication to activate a wake-up alert feature. In the feature event package 206, the input *55 may be the feature identification parameter and the "wake-up alert" may be the feature name.

The client logic 204 then provides the input to the SIP client protocol entity 208 in the client device 201. The SIP client protocol entity 208 creates the SIP event subscription request message which may include data corresponding to the input (in particular, a feature identification parameter). The SIP event subscription request message preferably conforms to a valid event (e.g., wake-up alert activation for 6:50 AM). In particular, the SIP event subscription request message may be a SIP SUBSCRIBE message conforming to RFC 3265.

For example, Table 1 depicts an exemplary SIP SUBSCRIBE message for activating the wake-up alert feature. The first line of this text-encoded SIP SUBSCRIBE message contains the method name (e.g., SUBSCRIBE). The lines that follow are a list of header fields which include data corresponding to the input. The header fields in Table 1 are (i) "To" (contains a display name or SIP request Universal Resource Indicator (URI) towards which the request was originally directed, and a tag parameter containing a random string (e.g., 78923) that is used for identification purposes), (ii) "From" (contains a display name and a SIP request URI that indicates the originator of the request, and a tag parameter containing a random string (e.g., 78923) that is used for identification purposes), (iii) "Date" (contains a date and time of the creation of the SIP SUBSCRIBE message), (iv) "Call ID" (contains a globally unique identifier for this call), (v) "CSeq" (contains a traditional sequence number), (vi) "Contact" (contains a SIP request-URI that represents a direct route to contact the sender), (vii) "Event" (contains the type of state such as feature for which a subscription is being requested and a feature identification parameter identifying the specific subscription) (viii) "Expires" (contains the duration of the subscription), (ix) "Accept" (indicates that a client device is capable of receiving the feature request information in a simple text-based format), (x) "Content-Length (contains the size of the SIP SUBSCRIBE message body). In addition, the "Event" header may contain additional information. For instance, to activate features such as call forwarding, the "Event header" may contain a forwarding-to number along with the feature identification parameter. Other examples and variations of the SIP event subscription request message are possible.

TABLE 1

EXAMPLE OF A SIP EVENT SUBSCRIPTION REQUEST MESSAGE
FOR ACTIVATING A WAKEUP ALARM FEATURE

SUBSCRIBE sip:nbx@3com.com SIP/2.0
To: <sip:nbx@3com.com>;tag=4442
From: <sip:udit@3com.com>;tag=78923
Date: Mon, 10 Feb 2005 15:55:06 GMT
Call-ID: 1349882@udit-phone.3com.com
CSeq: 1 SUBSCRIBE
Contact: <sip:udit@udit-phone.3com.com>
Event: feature; code=*55#0650; status=active
Expires: 86500
Accept: application/feature-info
Content-Length: 0

At step 404, the SIP client protocol entity 208 sends the SIP event subscription request message which includes data corresponding to the input. The SIP client protocol entity 208 may send the SIP event subscription request message through LAN 104 (or another network) using a SIP stack to the IPABX server 301. As noted above, the SIP stack may include multiple transmission layers enabling transmission of the SIP event subscription request message. In turn, the SIP server protocol entity 302 in the IPABX server 301 receives the SIP event subscription request message.

At step 406, the SIP server protocol entity 302 sends a SIP successful response message to the client device 201 through LAN 104 (or another network). The SIP successful response message indicates that the SIP event subscription request message has been received by the IPABX server 301. For example, the SIP successful response message may be an OKAY response message indicating that the SIP SUBSCRIBE message in Table 1 has been received by the IPABX server 301.

Table 2 depicts an exemplary OKAY response message sent in response to the SIP event subscription request message. Header fields such as "To," From "Date," "Call-Id," "C-Seq," "Contact," and "Content-Length" are similar to the header fields shown in the SIP SUBSCRIBE message in Table 1. The content of each of the above header fields is also similar to the content of each of the header fields shown in the SIP SUBSCRIBE message in Table 1. However, the content of the header field "Expires" is different from the content depicted in the SIP SUBSCRIBE message in Table 1 because the duration of the subscription for the wake-up alert feature has changed. Other examples and variations of the SIP successful response message are possible.

In effect, the SIP server protocol entity 302 may provide the data corresponding to the input from the SIP event subscription request message to server logic 306. The server logic 306 may determine from the data that a feature needs to be activated/deactivated using the definitions and parameters set forth in the feature event package 304. In particular, server logic 306 may use the feature event package 304 to recognize that the data corresponds to the feature name, the feature identification parameter and/or the feature supplemental parameter. The SIP server protocol entity 302 provides data in conformance with an application program interface (API) associated with server logic 306. In this manner, server logic 306 correlates the data to a particular feature that needs to be activated/deactivated. For example, the server logic 306 may determine that the content of the SIP SUBSCRIBE message in Table 1 indicates that a wake-up alert feature for 6:50 AM needs to be activated using the feature event package 304.

TABLE 2

EXAMPLE OF AN OKAY RESPONSE FOLLOWING A SIP EVENT SUBSCRIPTION REQUEST MESSAGE FOR ACTIVATING A WAKEUP ALARM FEATURE

SIP/2.0 200 OK
To: <sip:nbx@3com.com>;tag=4442
From: <sip:udit@3com.com/;tag=78923
Date: Mon, 10 Feb 2005 15:55:07 GMT
Call-Id: 1349882@udit-phone.3com.com
CSeq: 1 SUBSCRIBE
Contact: <sip:udit@udit-phone.3com.com>
Expires: 86400
Content-Length: 0

Responsively, the server logic 306 may instruct implementation logic 308 in the IPABX server to activate/deactivate the particular feature from the IPABX feature request. The implementation logic 308 may activate/deactivate the particular feature or the implementation logic 308 may instruct another server or device to activate/deactivate the particular feature. The implementation logic 308 may use PSTN 108 and IP network 110 in activating/deactivating the particular feature.

If implementation logic 308 activates/deactivates the feature, the implementation logic 308 may send status data indicating that the feature has been activated/deactivated to the server logic 306. The server logic 306 may then provide the status data to the SIP server protocol entity 302.

At step 408, the SIP server protocol entity 308 creates and sends the SIP event notification message, which includes the status data, to the client device 201 using a SIP stack over LAN 104 (or another network). The SIP event notification message may indicate that the feature from the IPABX feature request has been activated/deactivated. The SIP event notification message may be in the form of a SIP NOTIFY message conforming to RFC 3265. The SIP client protocol entity 208 in the client device 201 may receive the SIP event notification message.

Going back to the example, Table 3 depicts an exemplary SIP NOTIFY message indicating that a wake-up alarm has been activated for 6:50 AM. The first line of this text-encoded SIP NOTIFY message may contain the method name (e.g., NOTIFY). The lines that follow are a list of header fields that contain status data. Header fields such as "From," "Call-Id" and "Contact" are similar to the header fields in the SIP SUBSCRIBE message in Table 1. The content of each of these header fields is also similar to the header fields in the SIP SUBSCRIBE message in Table 1. However, the content of the header fields "To," "Date," "C-Seq," "Content-Length," and "Event" is different from the content of these header fields shown in the SIP SUBSCRIBE message in Table 1. The differences may reflect the purpose of the SIP NOTIFY message that the wake-up alert feature has been activated. Further, new header fields such as (i) "Subscription-State" (contains the state of information between a subscriber (e.g., client device) and a notifier (e.g., IPABX server)), (ii) "Feature-Status" (contains status information of the feature) (iii) "Status-message" (contains detailed information about a particular status of a feature and defines a message that may be displayed to a user of a client device), and (iv) Content-Type (describes a simple text-based format for a message), have been added to the SIP NOTIFY message. These header fields have been added to reflect the details of the activation of the wake-up alert feature. Particularly, the "Status-message" states that the "Wake-up service activated," and the "Feature-status" header field states "active". Other examples and variations of the SIP event notification message are possible.

TABLE 3

EXAMPLE OF A SIP EVENT NOTIFICATION MESSAGE INDICATING THAT A WAKEUP ALARM FEATURE IS ACTIVATED

NOTIFY sip:nbx@3com.com SIP/2.0
To: <sip:udit@3com.com>;tag=78923
From: <sip:udit@3com.com>;tag=4442
Date: Mon, 10 Feb 2005 15:55:07 GMT
Call-Id: 1349882@udit-phone.3com.com
CSeq: 47 NOTIFY
Contact: <sip:udit@vmail.3com.com>
Event: feature
Subscription-State: termination
Content-Type: application/feature-info
Content-Length: 66
Feature-Status: active
Status-Message: "Wakeup service is active"

If implementation logic 308 is unable to activate/deactivate the feature, implementation logic 308 may send status data to the server logic 306 indicating that the feature is not activated/ deactivated. The server logic may provide the status data to the SIP server protocol entity 302. The SIP server protocol entity 302 may create and send the SIP event notification message, which includes the status data, to the client device 201 using a SIP stack over LAN 104 (or another network). The SIP event notification message may indicate that the feature from the IPABX feature request is unable to be activated/deactivated. The SIP event notification message may be in the form of a SIP NOTIFY message conforming to RFC 3265. The SIP client protocol entity 208 in the client device 201 may receive the SIP event notification message.

For example, Table 4 depicts an exemplary SIP NOTIFY message indicating that the feature in not activated/deactivated. The header fields "To," "From," "Date," "Call-Id," "Contact," C-Seq," "Content-Length," "Event," "Content-Type," and "Subscription-State" are similar to the header fields in the SIP NOTIFY message in Table 3. The content of each of these header fields is also similar to the content in the header fields in the SIP NOTIFY message in Table 3. On the other hand, the content of "Feature-Status," and "Status-message" header fields is different from the SIP NOTIFY message in Table 3 as the differences reflect that the wake-up alert feature has not been activated. Further, a new header field such as "Reason" (contains reasons for failure of feature activation/deactivation) has been included to the existing header fields in the SIP NOTIFY message. In particular, the "Status-message" header field states "Wake-up service not activated," and the "Reason" header field states "Resources not available." Additionally, the "Feature-status" header field states "inactive" signifying that activation request has failed.

At step 410, the SIP client protocol entity 208 sends a SIP successful response message to the IPABX server 301 over LAN 104 (or another network). The SIP successful response message indicates that the SIP event notification message has been received by the client device 201. For example, the SIP successful response message may be an OKAY response message indicating that the SIP NOTIFY message in Tables 3 and 4 has been received by the IPABX server 301. Table 5 depicts an exemplary OKAY response message sent in response to the SIP event notification message. The header fields such as "To," "From," "Call-Id," and "Content-Length" are similar to the header fields in the OKAY message depicted in Table 3. The content of each of these header fields is also similar to the header fields in the OKAY message depicted in Table 3. However, the content of the header fields, "Date," "C-Seq," and "Event," reflect that the SIP event notification message has been received. Other examples and variations of the SIP successful response message are possible.

TABLE 4

EXAMPLE OF A SIP EVENT NOTIFICATION MESSAGE
INDICATING THAT A WAKEUP ALARM FEATURE
IS NOT ACTIVATED

NOTIFY sip:udit@udit-phone.3com.com SIP/2.0
To: <sip:udit@3com.com>;tag=78923
From: <sip:udit@3com.com>;tag=4442
Date: Mon, 10 Feb 2005 15:55:07 GMT
Call-Id: 1349882@udit-phone.3com.com
CSeq: 47 NOTIFY
Contact: <sip:udit@vmail.3com.com>
50Event: feature
Subscription-State: terminated
Content-Type: application/feature-info
Content-Length: 66
Feature-Status: inactive
Status-Message: "Wakeup service is not activated"
Reason: "Resources not available"

Following the SIP successful response message indicating that the SIP event notification message has been received, the SIP client protocol entity 208 provides the status data from the SIP event notification message to the client logic 204. The SIP event notification message may be, for instance, the SIP NOTIFY message in Tables 3 or 4.

TABLE 5

EXAMPLE OF AN OKAY RESPONSE FOLLOWING A SIP EVENT
NOTIFICATION MESSAGE INDICATING THAT A WAKEUP
ALARM FEATURE IS ACTIVATED

SIP/2.0 200 OK
To: <nbx@3com.com>;tag=78923
From: <sip:udit@3com.com>;tag=4442
Date: Mon, 10 Feb 2005 19:35:08 GMT
Call-Id: 1349882@udit-phone.3com.com
CSeq: 47 NOTIFY
Event: feature-info
Content-Length: 0

At step 412, the client logic 204 processes the status data to provide the user a status of the IPABX feature request. The status data indicates that the feature from the IPABX feature request has been activated/deactivated or is unable to be activated/deactivated. The status may be presented to the user in any format on the client device 201 and/or on a conventional telephone (and/or another device). For example, the status in the wake-up alert example may be a message stating "Wake-up service activated" shown by the client device 201 to the user.

Also referring back to the example, at 6:50 AM, the IPABX server 301 may send a message to the client device (e.g. an INVITE message described in RFC 3261 and/or RFC 3265) to create a ring at 6:50 AM.

The content in each of the header fields in the examples shown in Tables 1-5 are specific to the wake-up alert feature and are in accordance with the definitions described above for each header field. Each header field in Tables 1-5 may not necessarily be included in the messages while additional header fields may be added to the messages. Other examples and variations of header fields are possible.

3. Second Preferred Embodiment

In the second preferred embodiment, feature-based services may be invoked using new enhanced SIP methods from an IPABX feature set. The IPABX feature set may include features as defined in the first embodiment. The new enhanced SIP methods are two new methods to activate and deactivate features without the use of a feature event package. The new enhanced SIP methods also do not utilize SIP event notification messages and SIP event subscription request messages to activate and deactivate features.

The first enhanced SIP method is a new SIP method conforming to the definitions and criteria provided in RFC 3261 that invokes activation and deactivation of features. The new SIP method is preferably entitled "FEATURE." The new SIP method may be referred to as the SIP FEATURE method or simply as the FEATURE method. The FEATURE method includes a new request header, "Feature-Type," that contains a feature request string as defined by RFC 3261. The header field of "Feature-Type" contains a feature identification parameter. The header field of "Feature-Type" may further contain feature supplemental parameters. The Backus-Naur Form grammar (BNF) that defines the syntax and encoding of the FEATURE method is shown below.

Feature-Type="Feature-Type" HCOLON token

Preferably, the "Feature-Type" header and the header field are in the format shown below in which parameter1 and parameter2 represent the feature supplemental parameters.

Feature-Type: *feature identification parameter*parameter1*parameter2*

Preferably, the FEATURE method provides a direct request method to activate and deactivate features during a phone call, hereby known as a mid-call. This is because during an IP based phone call, a call session may be already established and no further sessions and signaling may be required if a feature is to be activated or deactivated using the FEATURE method. Although the FEATURE method is preferably applied for mid-call features, this method may be utilized in all circumstances such as when a call session is not established.

Next, the second enhanced SIP method is a feature enhanced SIP INVITE method that includes a feature identification parameter within a SIP Uniform Resource Identifier (URI) of an INVITE request method. The SIP URI of the feature enhanced SIP INVITE method may further include feature supplemental parameters. The feature enhanced SIP INVITE method may be known as feature enhanced INVITE method. The feature enhanced INVITE method is a request to initiate a call session as defined in RFC 3261 and is further discussed in the above paragraphs. However, the current INVITE method is not defined such that the SIP URI in the INVITE method includes a feature identification parameter.

The URI in the feature enhanced INVITE method has two parts, a user and a host, expressed as user@host (e.g., 1001@192.168.1.35). Preferably, the feature enhanced INVITE method is in the format shown below. The "user" part of a URI is replaced by the feature identification parameter and may be replaced by feature supplemental parameters (e.g., parameter1 and parameter2).

INVITE<sip; *feature identification parameter*parameter1*parameter2* . . . @host>

This feature enhanced INVITE method is preferably used to activate and deactivate during an out of call period (i.e., when no call session established). This is because during an IP based phone call, a call session using SIP INVITE may already be established and there may be a restriction on allowing only one SIP INVITE method to be established at a time.

a. Exemplary Architecture

Figure 5:
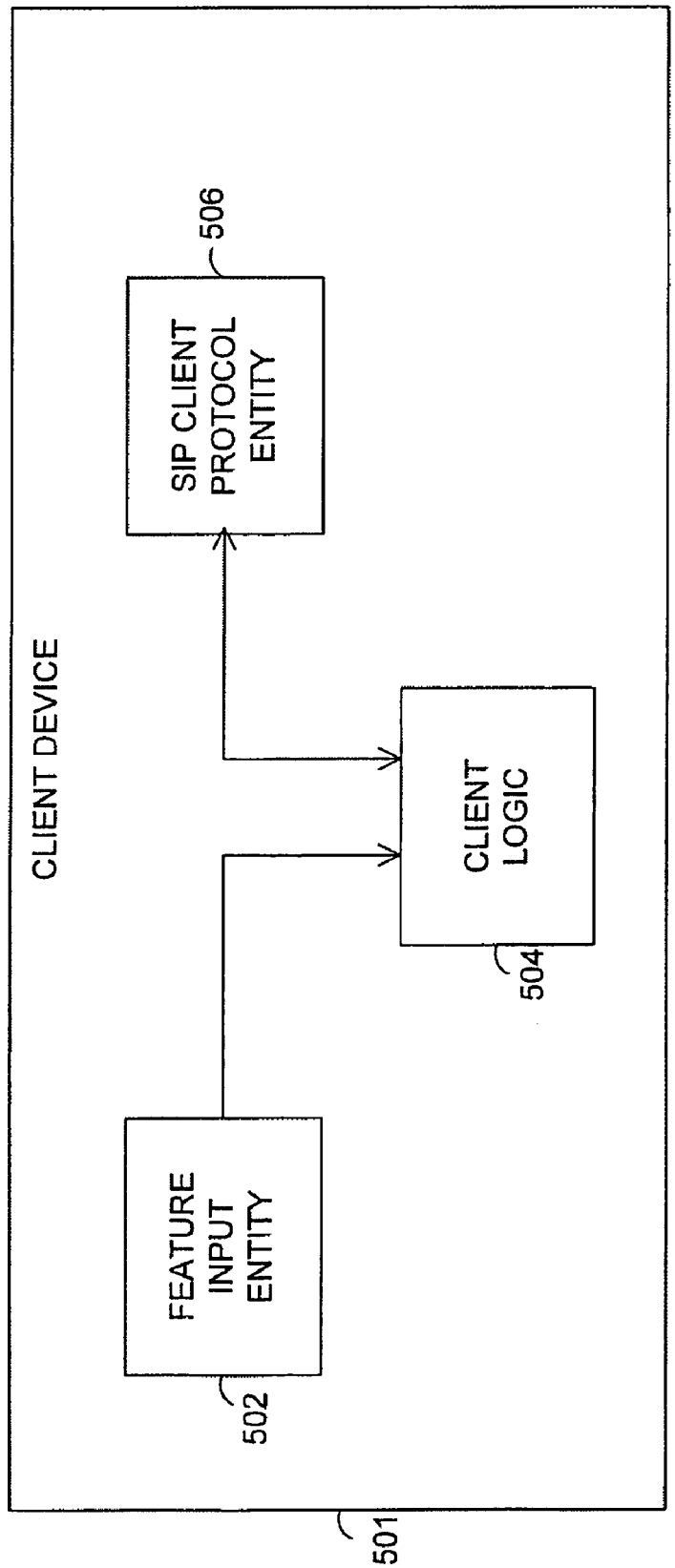
FIG. 5 illustrates a block diagram of a client device arranged to carry out the second preferred embodiment of the messaging system.

FIG. 5 depicts details of the client device 102 in accordance with the second preferred embodiment. The client device 501 is similar to the client device 201 except that the feature event package is excluded. Thus, the components and functions of client device 501 are similar to client device 201 excluding the components and functions associated with feature event package 206.

In FIG. 5, the SIP client protocol entity 506 is configured to create and send a SIP feature request messages using the enhanced SIP methods. The configuration may occur using hardware and/or software to create and send the SIP feature request message. Additionally, the SIP client protocol entity 506 is aware of its connectivity with the client logic 504. Thus, the client logic 504 maintains call state information that is used to determine which enhanced SIP method is appropriate for invoking a feature.

Figure 6:
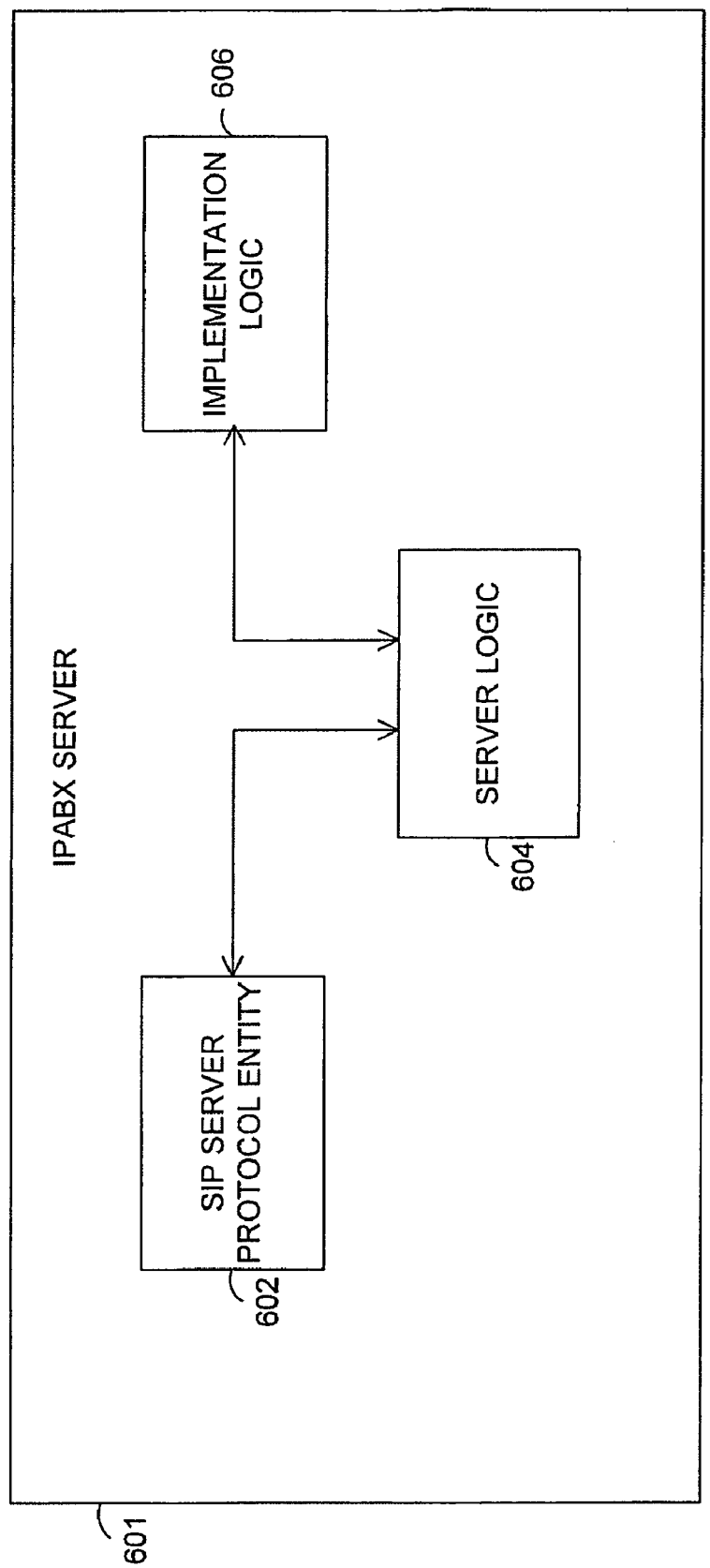
FIG. 6 illustrates a block diagram of an IPABX server arranged to carry out the second preferred embodiment of the messaging system.

FIG. 6 depicts an IPABX server 601 used to activate/deactivate features in accordance with the second preferred embodiment. The IPABX server 601 is similar to the IPABX server 301 except that the feature event package 304 is excluded. Thus, the components and functions of IPABX server 601 are similar to the IPABX server 301 excluding the components and functions associated with feature event package 304. Additionally, the SIP client protocol entity 506 is configured to send messages in response to a SIP feature request messages sent using enhanced SIP methods. The configuration may occur using hardware and/or software to create messages in response to the SIP feature request message.

b. Exemplary Operation

Figure 7:
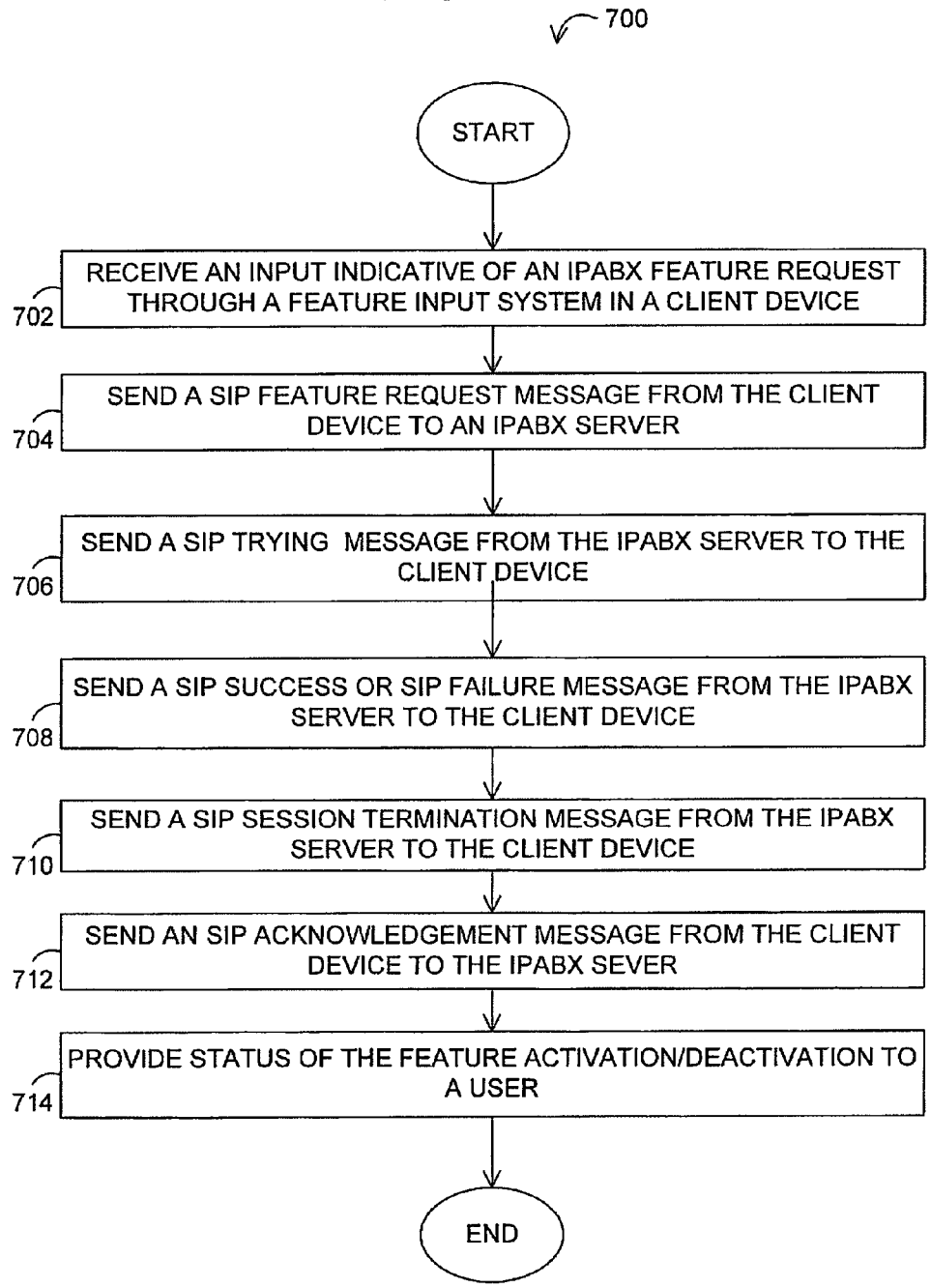
FIG. 7 depicts a flow chart of functions in accordance with the second preferred embodiment of the messaging system.

FIG. 7 is a flow chart 700 of functions carried out in accordance with the second embodiment. At step 702, the client device 501 receives input indicative of an IPABX feature request from a user in a manner shown in the first embodiment. Preferably, the client logic 504 in the client device 501 may gather all the necessary data from the input and determines that the input is an indication to activate or deactivate a feature. In response, the SIP client protocol entity 506 preferably creates a SIP feature request message using the enhanced SIP methods. The SIP feature request message is a SIP message sent to the IPABX server 601 to activate or deactivate a feature. The SIP feature request message may preferably includes a feature identification parameter and may include feature supplemental parameters.

If a mid-call feature is to be activated or deactivated, the SIP client protocol entity 506 preferably creates a SIP feature request message using the FEATURE method. The FEATURE method includes a header, "Feature-Type," that includes a feature identification parameter and may further include feature supplemental parameters.

The FEATURE method may be used to activate a call park feature. For example, a client device with extension 1000 is in a call with another client device with extension 1001. A user of the client device with extension 1000 decides to park a call with a user on the client device with extension 1001 at park extension 800. The user may dial digits *444*800 (in which 444 may be the feature identification parameter and 800 may be the feature supplemental parameter) directly into the feature input entity 502.

FIG. 8 is a diagram of a SIP feature request message that illustrates the call park activation example using the FEATURE method. The SIP feature request message includes a first line 802, and SIP headers 804-818. The SIP headers 804-818 may also be optional. The SIP feature request message may include other SIP headers, as well as other information in one or more of the SIP headers shown. The other SIP headers and the other information are not shown in FIG. 8 for clarity of defining the example embodiment.

The first line 802 identifies that the SIP feature request message is a SIP message using the FEATURE method, intended for the URI and that the version of SIP being used is "2.0." URI stands for "Uniform Resource Identifier," which is a mechanism by which entities on the Internet are identified and located. A URI defined for a user has two parts, a user and a host, expressed as user@host (e.g., 1001@192.168.1.35). The host part contains either a fully-qualified domain name or numeric Internet Protocol version 4 (IPv4) or Internet Protocol version 6 (IPv6) address.

The "VIA" header 804 specifies the version of SIP (2.0), the transport protocol (UDP), and the hostname of the originator of the SIP feature request message (192.168.1.113). The transport protocol may be UDP (User Data Protocol), TCP (Transmission Control Protocol), or some other transport protocol.

The "From" header 806 identifies the originator of the SIP feature request message which is the client device 501 with extension 1000. The "To" header 808 identifies the destination URI for the SIP feature request message, which matches the URI identified in the first line 802.

The "Call-Id" header 810 identifies a globally unique identifier for this call session, generated by a combination of a random string and the client device's host name or IP address. As explained earlier, the FEATURE method is useful to activate and deactivate mid-call features because extra signaling may be required to generate the globally unique identifier.

The "CSeq" header 812 (also known as Command Sequence header) contains an integer and a method name, FEATURE. The integer is incremented for each new request within an IP call session and is a traditional sequence number.

The new "Feature-Type" header 814 identifies the feature identification parameter 444 and feature supplemental parameter 800. The "Feature-Type" header provides information for the type of feature to be activated or deactivated.

The "Contact" header 816 identifies a return address. The return address provides a recipient of the SIP feature request message 800 with sufficient information so that the recipient can reply to the device that sent the SIP feature request message 800.

The "User Agent" header 818 identifies the details of the client device 501 used to send a SIP feature request message.

Next, if an out of call feature is to be activated or deactivated, the SIP client protocol entity 502 creates the SIP feature request message using an INVITE request method. The INVITE method contains a URI that includes a feature identification parameter and may include feature supplemental parameters.

FIG. 9 is a diagram of a SIP feature request message that illustrates the call park example using the feature enhanced INVITE method. The SIP feature request message includes a first line 902, and SIP headers 904-916. The SIP headers 804-818 may also be optional. The first line in the feature enhanced INVITE method includes a URI with the feature identification parameter and feature supplemental parameters (e.g., *444*800@192.168.1.35). The SIP headers 904-916 are as defined for FIG. 8. The header, "Feature-Type," is not included in the feature enhanced INVITE method, thus distinguishing this method from the FEATURE method. The SIP feature request message 900 may include other SIP headers, as well as other information in one or more of the SIP headers shown. The other SIP headers and the other information are not shown in FIG. 9 for clarity of defining the example embodiment.

Referring next to step 704 in FIG. 7, the SIP client protocol entity 508 creates and sends the SIP feature request message which includes data corresponding to the input such as the feature identification parameter and the feature supplemental parameters. The SIP feature request message is sent in the same manner as the SIP event subscription request message in the first preferred embodiment.

At step 706 in FIG. 7, the SIP server protocol entity 602 creates and sends a SIP trying response message to the client device 102 through LAN 104 (or another network). The SIP trying response message indicates that the SIP feature request message has been received by the IPABX server 601 and the IPABX server 601 is trying to activate or deactivate a feature from an IPABX feature set. The SIP trying response message may be in the form of a TRYING message conforming to RFC 3261.

Table 7 depicts an exemplary SIP TRYING response message sent in response to the SIP feature request message. Header fields such as "To," "From," "Via," "Call-Id," "C-Seq," "Contact," and "User-Agent" are similar to the header fields shown in FIG. 8. Further, the content of each of the above header fields is similar to the header fields shown in FIG. 8. Other examples and variations of the trying response message are possible.

TABLE 7

EXAMPLE OF A TRYING MESSAGE SENT IN THE CALL PARK EXAMPLE

SIP/2.0 100 Trying
Via: SIP/2.0/UDP 192.168.1.113:5060
From: <sip:1000@192.168.1.35;user=phone>;tag=667bfbb8
To: <sip:1001@192.168.1.35;user=phone>;tag=9848df5a
Call-Id: 667bfbb8-01d6-1f72-1422-00e0bb120c22@192.168.1.113
CSeq: 2 FEATURE
Contact: <sip:3comcallprocessor@192.168.1.115:5060>
User-Agent: 3Com Call Processor V61: 0

In effect, the SIP server protocol entity 602 may provide the data corresponding to the feature identification parameter and feature supplemental parameters from the SIP feature request message to server logic 606. The server logic 606 may determine from the data that a feature needs to be activated/deactivated using the data corresponding to the feature identification parameter and feature supplemental parameters. The SIP server protocol entity 602 provides data in conformance with an application program interface (API) associated with server logic 606. In this manner, server logic 306 correlates the data to a particular feature that needs to be activated/deactivated.

Responsively, the server logic 606 may instruct implementation logic 608 in the IPABX server 601 to activate/deactivate the particular feature from the IPABX feature request. The implementation logic 608 may activate/deactivate the particular feature or the implementation logic 608 may instruct another server or device to activate/deactivate the particular feature. The implementation logic 608 may use PSTN 108 and IP network 110 in activating/deactivating the particular feature.

If implementation logic 608 activates/deactivates the feature, the implementation logic 608 may send status data indicating that the feature has been activated/deactivated to the server logic 606. The server logic 606 may then provide the status data to the SIP server protocol entity 602.

At step 708 in FIG. 7, the SIP server protocol entity 308 creates and sends a SIP success message, which includes the status data, to the client device 501 using the SIP stack described in the first embodiment over LAN 104 (or another network). The SIP success message may indicate that the feature from the IPABX feature request has been activated/deactivated.

The SIP success message may be in the form of an OKAY message conforming to RFC 3261. For example, Table 8 depicts an exemplary OKAY message indicating that the feature is activated. Header fields such as "To," "From," "Via," "Call-Id," C-Seq," "Contact," and "User-Agent" are similar to the header fields shown in FIG. 8. Another header field "Warning" has been included to indicate the feature activation was successful. For example, the content of the "Warning" header states "Park Success: 800." Other examples and variations of the SIP success message are possible.

TABLE 8

EXAMPLE OF AN OKAY MESSAGE INDICATING THAT THE CALL PARK FEATURE HAS BEEN ACTIVATED

SIP/2.0 200 OK
Via: SIP/2.0/UDP 192.168.1.113:5060
From: <sip:1000@192.168.1.35;user=phone>;tag=667bfbb8
To: <sip:1001@192.168.1.35;user=phone>;tag=9848df5a
Call-Id: 667bfbb8-01d6-1f72-1422-00e0bb120c22@192.168.1.113

TABLE 8-continued

EXAMPLE OF AN OKAY MESSAGE INDICATING THAT THE
CALL PARK FEATURE HAS BEEN ACTIVATED

CSeq: 2 FEATURE
Warning: 399 192.168.1.115 "1001: Park Success: 800"
Contact: <sip:3comcallprocessor@192.168.1.115:5060>
User-Agent: 3Com Call Processor V61: 0

If implementation logic 608 is unable to activate/deactivate the feature, implementation logic 608 may send status data to the server logic 606 indicating that the feature is not activated/deactivated. The server logic may provide the status data to the SIP server protocol entity 602. The SIP server protocol entity 602 may create and send a SIP failure message to the client device 102 using a SIP stack over LAN 104 (or another network). The SIP failure message may indicate that the feature from the IPABX feature request is unable to be activated/deactivated. The SIP client protocol entity 208 in the client device 102 may receive the SIP failure message.

The SIP failure message may be in the form of a NOT ACCEPTABLE message conforming to RFC 3261. For example, Table 9 depicts an exemplary NOT ACCEPTABLE message indicating that the feature is unable to be activated. Header fields such as "To," "From," "Via," "Call-Id," "C-Seq," "Contact," and "User-Agent" are similar to the header fields shown in FIG. 9. Another header field "Warning" has been included to indicate that the feature activation/deactivation is unsuccessful. The content of the "Warning" header states "No Available Calls." Other examples and variations of the SIP failure message are possible.

TABLE 9

EXAMPLE OF AN FAILURE MESSAGE INDICATING THAT
THE FEATURE CANNOT BE ACTIVATED

SIP/2.0 406 Not Acceptable
Via: SIP/2.0/UDP 192.168.1.113:5060
From: <sip:1000@192.168.1.35;user=phone>;tag=667bfbb8
To: <sip:1001@192.168.1.35;user=phone>tag=9848df5a
Call-Id: 667bfbb8-01d6-1f72-1422-00e0bb120c22@192.168.1.113
CSeq: 2 FEATURE
Warning: 399 192.168.1.115 "5001 No Available Calls"
Contact: <sip:3comcallprocessor@192.168.1.115:5060>
User-Agent: 3Com Call Processor V61: 0

At step 710 in FIG. 7, following the SIP success or SIP failure message, the IPABX server 601 sends a SIP session termination message to the client device 201 indicating that the IPABX server 601 has terminated the call session. The SIP session termination message may be in the form of a BYE message conforming to RFC 3261. For example, Table 10 depicts an exemplary BYE message. Header fields such as "To," "From," "Via," "Call-Id," "C-Seq," "Contact," and "User-Agent" are similar to the header fields shown in FIG. 9. Other examples and variations of the SIP session termination message are possible.

TABLE 10

EXAMPLE OF A BYE MESSAGE INDICATING THAT A
SESSION HAS ENDED IN THE CALL PARK EXAMPLE

BYE sip:1000@192.168.1.35 SIP/2.0
Via: SIP/2.0/UDP 192.168.1.113:5060
To: <sip:1000@192.168.1.35;user=phone>;tag=667bfbb8
From: <sip:1001@192.168.1.35;user=phone>;tag=9848df5a
Call-Id: 667bfbb8-01d6-1f72-1422-00e0bb120c22@192.168.1.113
CSeq: 4 BYE
User-Agent: 3Com Call Processor V61: 0

At step 712 in FIG. 7, the client device 501 creates and sends a SIP acknowledgement message following the SIP session termination message to the IPABX server 601 indicating the acknowledgement of the call session termination. The SIP acknowledgement message may be in the form of an OKAY message conforming to RFC 3261. For example, Table 11 depicts an exemplary OKAY message. Header fields such as "To," "From," "Via," "Call-Id," "C-Seq," "Contact," and "User-Agent" are similar to the header fields shown in FIG. 9. Other examples and variations of the SIP acknowledgement message are possible.

The SIP client protocol entity 508 in the client device 501 may receive the SIP success or failure message. The SIP client protocol entity 508 provides the status data from the SIP success or failure message to the client logic 504.

TABLE 11

EXAMPLE OF AN OKAY MESSAGE INDICATING AN
ACKNOWLEDGEMENT TO THE BYE MESSAGE IN
THE CALL PARK EXAMPLE

SIP/2.0 200 OK
Via: SIP/2.0/UDP 192.168.1.113:5060
To: <sip:1000@192.168.1.35;user=phone>;tag=667bfbb8
From: <sip:1001@192.168.1.35;user=phone>;tag=9848df5a
Call-Id: 667bfbb8-01d6-1f72-1422-00e0bb120c22@192.168.1.113
CSeq: 4 BYE
User-Agent: 3Com SIP Phone 61: 0

At step 714, the client logic 504 processes the status data to provide the user a status of the IPABX feature request. The status data may indicate that the feature from the IPABX feature request has been activated/deactivated or is unable to be activated/deactivated. The status may be presented to the user in any format on the client device 501 as described in the first embodiment.

The content in each of the header fields in the examples shown in Tables 7-11 and FIGS. 8-9 are in accordance with the definitions described above for each header field. Each header field in Table 7-11 and FIGS. 8-9 may not necessarily be included in the messages while additional header fields may be added to the messages. Other examples and variations of header fields are possible.

IV. Conclusion

In addition, when messages are received either by the client device 102 or the IPABX server 106, these messages may be authenticated by the receiving entity. In particular, specific header fields may be included in each of these messages that are recognized by the client device 102 or the IPABX server 106. This specific header field may be used to classify the messages as authentic (i.e., coming from a valid and recognizable source). Other mechanisms of authentication may be utilized.

Further, messages may be first sent to a proxy and then to the client device 102 and the IPABX server 106. This proxy may be located between the client device 102 and the IPABX server 106.

In an alternative preferred embodiment, the IPABX server 106 may provide an interface (e.g., web interface) for activation/deactivation of features from an IPABX feature set. If the IPABX server 106 is not equipped to provide an interface, then a separate interface attachment may be connected to the IPABX server 106. The interface may allow an administrator or a user to activate/deactivate a feature. Using the interface, the administrator or user may send a message to the IPABX server 106 to activate/deactivate a feature. In particular, an administrator may send a proprietary message (i.e., in Extensible Markup Language form) instructing the server to activate/deactivate a feature.

Using the alternative preferred embodiment, the client device 102 may not need to send a SIP event subscription request message, SIP feature request message, or an invite request message to the IPABX server 106. Once the feature is activated/deactivated through the interface, the IPABX server 301 may notify the client device 201 that the feature has been activated/deactivated following the steps 408, 410, and 412 depicted in FIG. 4 or the steps 708, 710, 712, and 714 in FIG. 7. As an example, a particular type of SIP NOTIFY message (e.g., BLIND SIP NOTIFY) may be transmitted to the client device 201. This type of SIP NOTIFY message conforms to RFC 3261 and/or RFC 3265 and is preferably not transmitted in response to a SIP SUBSCRIBE message. In turn, the user may be presented with a status of the feature activation/deactivation.

A preferred embodiment of the present invention has been described above. Those skilled in the art will understand, however, that changes and modifications may be made to this embodiment without departing from the true scope and spirit of the present invention, which is defined by the claims. It is best understood that the wake-up alert and call park feature activation are just two examples in which the preferred embodiment may be described. Examples using other features in the IPABX feature set or elsewhere may also be in the context of the preferred embodiment. Although the invention has been described in the context of activation/deactivation of a feature-based service using a SIP event package, other mechanisms within the context of the present invention are possible.

We claim:

1. In a client device communicatively coupled with an Internet Protocol Automatic Branch Exchange (IPABX) server, a method of activating an IPABX feature from an IPABX feature set using Session Initiation Protocol (SIP) and a feature event package, the method comprising:
   at the client device, receiving an input indicative of an IPABX feature request for at least one feature from the IPABX feature set;
   at the client device, creating a SIP event subscription request message in response to the input, wherein the SIP event subscription message includes a feature identification parameter corresponding to the at least one feature from the IPABX feature set;
   sending the SIP event subscription request message from the client device to the IPABX server to request activation by the IPABX server of the at least one feature from the IPABX feature set;
   at the client device, receiving from the IPABX server, in response to the SIP event subscription request message, a SIP event notification message, wherein the SIP event notification message includes a status of the IPABX feature request indicating whether the at least one IPABX feature is activated or deactivated; and
   at the client device, sending to the IPABX server, in response to the SIP event notification message, a SIP successful response message indicating that the SIP event notification message has been received.

2. The method of claim 1, wherein the feature event package comprises at least one item from a group consisting of feature name, feature identification parameter, and feature supplemental parameter.

3. The method of claim 1, wherein the SIP event subscription request message comprises a SIP SUBSCRIBE message.

4. The method of claim 1, wherein the SIP event notification message comprises a SIP NOTIFY message.

5. The method of claim 1, wherein the input indicative of the IPABX feature request comprises at least one item from a group consisting of a keypad input, and a voice input.

6. The method of claim 5, wherein both the keypad input, and the voice input comprise a feature identification parameter.

7. The method of claim 5, wherein both the keypad input, and the voice input comprise a feature supplemental parameter.

8. The method of claim 1, wherein the IPABX feature set includes at least one item from a group consisting of voicemail configuration, wake up alert, music on hold, video on hold, call park, call pickup, call toggle, caller identification restriction, conference call, direct mail transfer, do not disturb, flash, call forwarding, hold, lock your telephone, voicemail retrieval message, redial, show lists, speed dial, transfer, and paging.

9. The method of claim 1, further comprising presenting the status of the IPABX feature request to a user of the client device.

10. In an Internet Protocol Automatic Branch Exchange (IPABX) server communicatively coupled with a client device, a method of activating an IPABX feature from an IPABX feature set using Session Initiation Protocol (SIP) and a feature event package, the method comprising:
    at the IPABX server, receiving from the client device a SIP event subscription request message, wherein the SIP event subscription message comprises an IPABX feature request for activation by the IPABX server of at least one feature from the IPABX feature set and includes a feature identification parameter corresponding to the at least one feature from the IPABX feature set;
    at the IPABX server, sending to the client device, in response to the SIP event subscription request message, a SIP successful response message indicating that the SIP event subscription request message has been received;
    at the IPABX server, creating a SIP event notification message in response to the SIP event subscription request message, wherein the SIP event notification message includes a status of the IPABX feature request indicating whether the IPABX feature is activated or deactivated;
    at the IPABX server, activating the IPABX feature based on information provided in the SIP event subscription request message; and
    sending the SIP event notification message to the client device.

11. The method of claim 10, wherein the feature event package comprises at least one item from a group consisting of feature names, feature identification parameters, and feature supplemental parameters.

12. The method of claim 10, wherein creating the SIP event notification message comprises:
    setting the status of the IPABX feature request to active status if the IPABX feature is activated; and
    setting the status of the IPABX feature request to inactive status if the IPABX feature is not activated.

13. In a client device communicatively coupled with an Internet Protocol Automatic Branch Exchange (IPABX) server, a method of activating an IPABX feature from an IPABX feature set using Session Initiation Protocol (SIP), the method comprising:
    at the client device receiving an input indicative of an IPABX feature request for at least one feature from the IPABX feature set;

at the client device, creating a SIP feature request message in response to the input, wherein the SIP feature request message includes a feature identification parameter corresponding to the at least one feature from the IPABX feature set;

sending the SIP feature request message from the client device to the IPABX server to request activation by the IPABX server of the at least one feature from the IPABX feature set; and at the client device, receiving a response message from the IPABX server in response to the SIP feature request message, the response message being a SIP success message if the at least one feature from the IPABX feature set is activated or a SIP failure message if the at least one feature from the IPABX feature set is not activated.

14. The method of claim 13, wherein the input indicative of the IPABX feature request comprises at least one item from a group consisting of a keypad input, and a voice input.

15. The method of claim 14, wherein both the keypad input, and the voice input comprise a feature identification parameter.

16. The method of claim 14, wherein both the keypad input, and the voice input comprise a feature supplemental parameter.

17. The method of claim 13, further comprising presenting information from the response message to a user of the client device.

18. The method of claim 13 wherein the SIP feature request message comprises
  a SIP FEATURE method that includes a SIP header field comprising a feature identification parameter, wherein the SIP header field is defined by a SIP feature request string.

19. The method of claim 18, wherein the SIP feature request string includes a feature supplemental parameter.

20. The method of claim 18, wherein the SIP feature request message further comprises:
  a data field containing a method name indicating the SIP FEATURE method;
  a header field containing a hostname of a originator of the SIP feature request message;
  a header field containing a SIP request Universal Resource Indicator (URI) towards which the SIP feature request message is directed; and
  a header field containing a globally unique identifier for the SIP feature request message.

21. The method of claim 13 wherein the SIP feature request message comprises
  a feature enhanced SIP INVITE method that includes a SIP Uniform Resource Identifier (URI), wherein the SIP URI includes a feature identification parameter.

22. The method of claim 21, wherein the SIP URI includes a feature supplemental parameter.

23. In an Internet Protocol Automatic Branch Exchange (IPABX) server communicatively coupled with a client device, a method of activating an IPABX feature from an IPABX feature set using Session Initiation Protocol (SIP), the method comprising:
  at the IPABX server, receiving from the client device a SIP feature request message, wherein the feature request message comprises a request for activation by the IPABX server of at least one feature from the IPABX feature set and includes a feature identification parameter corresponding to the at least one feature from the IPABX feature set;
  at the IPABX server, activating the at least one feature from the IPABX feature set based on information provided in the SIP feature request message;
  creating and sending a SIP success message if the at least one feature from the IPABX feature set is activated; and
  creating and sending a SIP failure message if the at least one feature from the IPABX feature set is not activated.

24. A client device communicatively coupled with an Internet Protocol Automatic Branch Exchange (IPABX) server comprising:
  an input entity;
  a processor;
  machine-readable memory; and
  logic instructions stored in the machine-readable memory and executable by the processor to:
    receive an input from the input entity, wherein the input is indicative of an IPABX feature request for at least one feature from a IPABX feature set,
    create a Session Initiation Protocol (SIP) feature activation request message in response to the input, wherein the SIP feature activation request message includes a feature identification parameter corresponding to the at least one feature from the IPABX feature set,
    send the SIP feature activation request message to the IPABX server to request activation by the IPABX server of the at least one feature from the IPABX feature set,
    receive from the IPABX server, in response to the SIP feature activation request message, a SIP response message, wherein the SIP response message includes a status of the IPABX feature request indicating whether the IPABX feature is activated or deactivated, and
    present the status of the IPABX feature request to a user of the client device.

25. The client device of claim 24, wherein the SIP feature activation request message comprises a SIP SUBSCRIBE message and the SIP response message comprises a SIP NOTIFY message.

26. The client device of claim 24, wherein the SIP feature activation request message comprises a SIP feature request message,
  wherein the SIP feature request message is selected from a group consisting of (i) a SIP FEATURE method that includes a SIP header field comprising a feature identification parameter and being defined by a SIP feature request string, and (ii) a feature enhanced SIP INVITE method that includes a SIP Uniform Resource Identifier (URI) comprising a feature identification parameter,
  and wherein the SIP response message is a SIP success message if the at least one feature from the IPABX feature set is activated or a SIP failure message if the at least one feature from the IPABX feature set is not activated.

27. The client device of claim 24, wherein the logic instructions stored in the machine-readable memory are further executable by the processor to send to the IPABX server, in response to the SIP response message, a successful response message indicating that the SIP response message has been received.

28. The client device of claim 24, wherein the feature input entity comprises at least one item from a group consisting of a feature button, keypad dialing buttons, and a voice activated system.

29. An Internet Protocol Automatic Branch Exchange (IPABX) server communicatively coupled with a client device comprising:

a processor;

machine-readable memory; and logic instructions stored in the machine-readable memory and executable by the processor to:

receive from the client device a feature activation request message, wherein the feature activation request message comprises a Session Initiation Protocol (SIP) SUBSCRIBE message for requesting activation by the IPABX server of at least one feature from an IPABX feature set and includes a feature identification parameter corresponding to the at least one feature from the IPABX feature set, send to the client device, in response to the feature activation request message, a SIP successful response message indicating that the SIP SUBSCRIBE message has been received, create a SIP NOTIFY message in response to the SIP SUBSCRIBE message, wherein the SIP NOTIFY message includes a status of the feature activation request, activate the IPABX feature based on information provided in the SIP event subscription request message, and send the SIP event notification message to the client device.

30. An Internet Protocol Automatic Branch Exchange (IPABX) server communicatively coupled with a client device comprising:

a processor;

machine-readable memory; and logic instructions stored in the machine-readable memory and executable by the processor to:

receive from the client device a Session Initiation Protocol (SIP) feature request message, wherein the SIP feature request message comprises a request for activation by the IPABX server of at least one feature from an IPABX feature set and includes a feature identification parameter corresponding to the at least one feature from the IPABX feature set, activate the at least one feature from the IPABX feature set based on information provided in the SIP feature request message, create and send a SIP success message if the at least one feature from the IPABX feature set is activated, and create and send a SIP failure message if the at least one feature from the IPABX feature set is not activated, wherein the SIP feature request message is selected from a group consisting of (i) a SIP FEATURE method that includes a SIP header field comprising a feature identification parameter and being defined by a SIP feature request string, and (ii) a feature enhanced SIP INVITE method that includes a SIP Uniform Resource Identifier (URI) comprising a feature identification parameter.

* * * * *